(12) United States Patent
Zeng

(10) Patent No.: US 10,398,968 B2
(45) Date of Patent: Sep. 3, 2019

(54) MULTI-MODE CONTROLLED ACOUSTO-OPTIC INTERACTION INFANT GAME MAT WITH LOGIC AND SENSORY INTEGRATION TRAINING FUNCTION

(71) Applicant: Di Zeng, Guangxi (CN)

(72) Inventor: Di Zeng, Guangxi (CN)

( * ) Notice: Subject to any disclaimer, the term of this patent is extended or adjusted under 35 U.S.C. 154(b) by 682 days.

(21) Appl. No.: 15/181,382

(22) Filed: Jun. 13, 2016

(65) Prior Publication Data

US 2017/0120145 A1    May 4, 2017

Related U.S. Application Data

(63) Continuation of application No. PCT/CN2015/093132, filed on Oct. 28, 2015.

(51) Int. Cl.
*A63F 9/24* (2006.01)
*A63F 13/28* (2014.01)
(Continued)

(52) U.S. Cl.
CPC .............. *A63F 13/28* (2014.09); *A63F 13/24* (2014.09); *A63F 13/332* (2014.09)

(58) Field of Classification Search
CPC ........ A63F 13/28; A63F 13/332; A63F 13/24; A63F 13/214; G09B 5/06; A63H 33/006; A63H 5/00
See application file for complete search history.

(56) References Cited

U.S. PATENT DOCUMENTS 3,771,123 A * 11/1973 Lanes ................. B60Q 1/2611
                                                         340/435
5,839,976 A * 11/1998 Darr ........................ A63B 5/22
                                                         473/414
(Continued)

FOREIGN PATENT DOCUMENTS

CN         201536865 U      8/2010
CN         102157079 A      8/2011
(Continued)

OTHER PUBLICATIONS

CN 202554921. Machine Translation. Liang, Linglin and Chen, Jiangnan. Published Nov. 28, 2012. Translated via Google translate. (Year: 2012).*

(Continued)

*Primary Examiner* — Dmitry Suhol
*Assistant Examiner* — Carl V Larsen

(57) ABSTRACT

A multi-mode controlled acousto-optic interaction infant game mat with logic sensory integration training function, including a mat body, a main controller at one side of the mat, transmission wires embedded in the mat, a wireless remote controller and acousto-optic units. There are several round holes on the mat. The snap rings are installed around the internal edge of the round holes for installing and fixing acousto-optic unit. The acousto-optic units are connected and the acousto-optic unit and main controller are connected by the transmission wires embedded inside the mat. The game mat can be used as a protection soft mat for the indoor play of a 0-3 year-old infant, and can also initiatively guide the infant to crawl toward different positions through visual and audio references for the purpose of entertainment and sports activities combined.

25 Claims, 6 Drawing Sheets

(51) Int. Cl.
*A63F 13/24* (2014.01)
*A63F 13/332* (2014.01)

(56) References Cited

U.S. PATENT DOCUMENTS

| | | | |
|---|---|---|---|
| 5,865,664 A | 2/1999 | Martey | |
| 5,910,560 A * | 6/1999 | Nagashima | C08L 69/00 525/192 |
| 5,971,761 A * | 10/1999 | Tillman, Sr. | G09B 5/06 434/159 |
| 6,761,563 B1 * | 7/2004 | Lin | G09B 5/062 273/153 R |
| 9,373,244 B2 * | 6/2016 | Hu | G08B 21/24 |
| 9,572,517 B2 * | 2/2017 | Ng | A47D 15/003 |
| 2007/0157271 A1 * | 7/2007 | Hiraoka | H04N 7/17309 725/100 |
| 2010/0297597 A1 * | 11/2010 | Kim | G09B 5/06 434/362 |
| 2014/0093859 A1 | 4/2014 | Zhang | |
| 2014/0132844 A1 * | 5/2014 | Burns | H04N 5/44 348/734 |
| 2014/0375434 A1 * | 12/2014 | Puljan | F21V 33/004 340/12.5 |
| 2018/0021677 A1 * | 1/2018 | McClard | A63F 9/24 463/31 |
| 2018/0158349 A1 * | 6/2018 | Cavallo | G09B 5/06 |

FOREIGN PATENT DOCUMENTS

| | | |
|---|---|---|
| CN | 202554921 U | 11/2012 |
| CN | 203280124 U | 11/2013 |
| CN | 203425521 U | 2/2014 |
| CN | 203483872 U | 3/2014 |
| CN | 204182141 U | 3/2015 |
| CN | 204378609 U | 6/2015 |
| CN | 104771016 A | 7/2015 |
| CN | 204580639 U | 8/2015 |
| CN | 105212594 A | 1/2016 |
| CN | 205285729 U | 6/2016 |

OTHER PUBLICATIONS

International Search Report of PCT Patent Application No. PCT/CN2015/093132 dated Jul. 26, 2016.

1st Office Action of counterpart Chinese Patent Application No. 201510712763.3 dated Jun. 2, 2017.

* cited by examiner

MULTI-MODE CONTROLLED ACOUSTO-OPTIC INTERACTION INFANT GAME MAT WITH LOGIC AND SENSORY INTEGRATION TRAINING FUNCTION

CROSS-REFERENCE TO RELATED APPLICATIONS

This present application is a Continuation Application of PCT application No. PCT/CN2015/093132 filed on Oct. 28, 2015, the contents of which are hereby incorporated by reference.

BACKGROUND

Technical Field

The present application discloses a game mat which is placed on floor for infant crawling and playing. Specifically, it is a multi-mode controlled acousto-optic interaction infant game mat with logic and sensory integration training function.

Related Art

The existing infant crawling mat in the market is a protection soft mat for 0-3 year-old infant to crawl and play indoors. It is made of plastic, foam plastic, cotton, polyester and other materials. The size is equal to or bigger than 1 square meter. The mat is decorated with vivid and colorful patterns. When infants sit or crawl or lie down on the soft mat, the parents may guide the infant from one side while playing or walking to different directions with toys, sound, songs, etc. The infant crawling mat is big in size and made of soft material. It can protect infants from injuries when falling down during indoor activities. The common infant crawling mat cannot guide or positively entertain the infant. For example, a Chinese patent with application number 200920187856.9 discloses a toy mat. It is composed of one cloth mat, and there is a pillow mat sewed on the top part of the cloth mat. The pillow mat is in the shape of a human face and has concave in middle, which is surrounded by U-shaped pillow bumps. The column shaped soft pillows are sewed to both sides underneath the pillow mat. The mat of the patent features a simple structure, attractive appearance, and function of protection, but it doesn't have the function to initiatively guide the infant to crawl and play. Another example is a Chinese patent with application number 201320366228.3. It discloses an infant game mat with piano music, including a first cross slab and a second cross slab. The first cross slab is provided with a first lug at the left side and a second lug at the right side. The second cross slab is provided with a third lug at the left side and a fourth lug at the right side. A piano is installed between the first lug and the third lug. A curved pipe is installed between the second lug and the fourth lug. The piano has a lot many piano keys. Several toys are hung on the curved pipe. The mat of the patent can exercise the infant's hands-on ability, but it is only suitable for older children (at least 2 years old) and it doesn't have the function to initiatively guide the babies. Another example is a Chinese patent with application number 201320509377.0. It discloses a toy mat. It is a mat with at least one light-emitting module, which comes with a light guide plate, which is equipped with at least one switch and at least one illuminator. The mat also has a controller at one side. The controller is connected electrically with the switch and the illuminator. The switch can be triggered by pressing down the light guide plate, so the controller can generate corresponding control actions. When the mat is folded, it overcomes the disadvantage that the carbon black is easily cracked and electricity is disconnected. The mat disclosed in the patent is provided with an illuminator and can solve the problem of electricity conduction, but this mat is not suitable for infant to play, and has no function to guide the infant while crawling or playing. In comparison to the presented application, the existing patents and existing products can't generate both sound and light at same time, or match different kinds of sound with changing light colors according to certain logical rules, therefore they cannot exercise nor strengthen the infant's vision and auditory nerve interaction and help them establish logical induction, logical reasoning concepts through light and sound matching and changing. The game mat disclosed in the present application can also produce vivid light and lovely funny sounds, and control and change the position of light and sound, the game mat can guide the infant to crawl or walk toward the direction of constantly changing lights and sounds. Not only does this strengthen the infant's audible and visual reaction, it also promotes the physical fitness of the infant. More importantly, the present application considers the requirement of all infants in functional structure, materials, safety protection and other aspects. It is even suitable for newborn babies. The existing patents and products do not have those advantages.

SUMMARY

In order to overcome the shortcoming of the existing infant crawling mats that cannot guide active infants and reduce parent's burden to take care of infants, the present application discloses a multi-mode controlled acousto-optic interaction infant game mat with logic and sensory integration training function. The game mat can be used not only as a protection mat for 0-3 year-old infants to play on indoors, but can also guide the infant to crawl towards different positions by making sounds and emitting lights, to provide opportunities to both entertain and exercise infants.

The present application adopts the following technical solutions:

A multi-mode controlled acousto-optic interaction infant game mat with logic and sensory integration training function includes a mat body, a main controller at one side of the mat, transmission wires embedded in the mat, a wireless remote controller and acousto-optic units. There are several round holes on the mat. The snap rings are installed around the internal edge of the round holes for installing and fixing acousto-optic units. The acousto-optic units are connected with each other and the acousto-optic units and main controller are connected by the transmission wires embedded inside the mat.

The present application features a simple structure, as well as a scientific and reasonable design. It can direct the infant to crawl towards different positions for the purpose of entertainment and sports activities. When an acousto-optic unit assigned on the game mat receives command signal, the acousto-optic unit will glow and produce the sound which is set in advance, to attract the attention of the infant. The baby attracted by the light and sound will crawl to the area glowing at this time. By repeating such activities, the game mat also becomes a training device for the infant to practice crawling and to train the infant's sensitivity to sound and light, which brings happiness to the infant and the parents, and assists the infant for physical and mental development.

Further in the present application, the acousto-optic unit includes mainly a protection cover, a vibration sensor, a perforated anti-collision mat layer, a sound generator, an illuminator, a spotlight reflector, a signal processing control chip II, a digital audio file storage medium, an audio playing chip, a power amplifying circuit, a LED drive chip and a branch electric contact III etc.

Further in the present application, the acousto-optic units are connected with each other by wired connection mode or wireless connection mode. When using wired connection mode, the connecting device is an electric wire. The acousto-optic units are connected with each other, and the acousto-optic units and main controller are connected by electric wires. The wires are used for transmitting currents, sound and light control signals. When using wireless connection mode, the acousto-optic unit is a wireless acousto-optic unit. Compared with the wired acousto-optic unit, the wireless acousto-optic unit is provided with a built-in battery bin or a rechargeable battery, a wireless signal emitter II, a wireless signal receiver II, a signal processing control chip I and a suction disc.

Further in the present application, the wireless acousto-optic unit using wireless connection mode is provided with wireless signal transmission module inside. The module is composed of the wireless signal transmitter II and wireless signal receiver II. When the wireless receiver II inside the acousto-optic unit receives the control signal, the signal is transmitted to the signal processing control chip I at the back end. The control chip converts any signal into multiple action commands respectively to the audio playing chip, the power amplifying circuit and sound generator, or to LED drive chip to LED lamp, to start and change the sound and light of the wireless acousto-optic unit. In motion sensing control mode, the signal processing control chip I can also emit sound and light control signals to control the switch of the sound generator and illuminators of other wireless acousto-optic units, and change their sound and light color. The sound and light control signals are transmitted by the wireless signal transmitter II of the present acousto-optic unit to the wireless signal receiver II of other wireless acousto-optic unit. The wireless signal receiver II receives the sound and light control signals, and then transmits the signals to the signal processing control chip I of the acousto-optic unit. The signal processing control chip II through controlling the audio playing chip, the power amplifying circuit, the LED drive chip, the sound generator and LED lamps, finally realizes controlling the switch of the sound generator and illuminator of the wireless acousto-optic unit, and change the sound and lamp color.

Further in the present application, the bottom of the wireless acousto-optic unit is provided with a suction disc. The suction disc is in a screw snap structure and can be removed independently and separated from the wireless acousto-optic unit. When the suction disc is used, just press down and rotate the suction disc at the bottom, and then the suction disc can be fixed on the wireless acousto-optic unit. Be aware of the following functions: ① For a user who has a common infant ground mat, the wireless acousto-optic unit can be placed directly on the mat and fixed by the suction disc for training or games. ② For infants who can walk or run, the wireless acousto-optic unit can be fixed on a wall or other smooth vertical surfaces with the suction disc for training or playing games while standing or walking.

Further in the present application, a main controller is installed at an appropriate position of the mat. The main controller is mainly composed of a rack for placing wireless remote controllers, a transformer, external power supply wires, a centralized signal processing control module, a wireless signal receiving module, a program control chip and a working power supply.

Further in the present application, the rack is installed on the upper surface of the main controller and is in a recessing downward shape. The width and size of the recessed area is fitted for the wireless remote controller. Lugs symmetrically disposed on both sides of the rack are used for clamping and fixing the controller. When the wireless remote controller is placed in the rack, there are no panels or buttons on the main controller, only the panel and function buttons of the wireless remote controller are used. This is achieved by the branch electric contact II at the corresponding position of the rack lug and the wireless remote controller. When the wireless remote controller is placed into the rack, the branch electric contact II on the wireless remote controller is connected tightly with the branch electric contact I on the rack lug. The control signal can then be transmitted, so panel and the function buttons of the wireless remote controller can be operated to control the main controller.

The snap ring is provided with two snap ports at opposite positions for fixing the acousto-optic unit and the branch electric contact IV. When the acousto-optic unit is placed into the snap ring, the snap ports are aligned with two snap buckles on the acousto-optic unit to fix the acousto-optic unit. When taking out the acousto-optic unit, just press down the snap buckles. This structure is beneficial to cleaning the game mat as the acousto-optic unit can be removed and reinstalled easily, and can also prevent the infant from moving or taking away the acousto-optic unit.

Further in the present application, branch electric contact III is disposed at one side of the bottom of the acousto-optic unit's housing. One side of the branch electric contact is facing outward and another side is facing towards the acousto-optic unit, and connects with wire pins from the devices on the electric circuit board inside the acousto-optic unit. When the acousto-optic unit is installed and fixed on the snap ring, the branch electric contact III on the acousto-optic unit is connected with the branch electric contact IV on the snap ring, so that the control signal, audio signal and electric current from the controller can be transmitted to the signal processing control chip II in the acousto-optic unit for starting up the acousto-optic unit and changing its working status. The branch electric contact is composed of a bottom plate with insulating material and 4 pieces of separated metals. 4 metal plates are arranged separately on the bottom plate and connected respectively with signal wires, audio wires, power lines and common wires of the transmission wires. 4 metal plates are insulated completely and are not connected to each other.

In the present application, a wireless remote controller is designed to control the game mat for all functions from a long distance away. The functions include switching sound and light on and off, changing direction, changing the types of sound and light color, and selecting control mode.

Further in the present application, the wireless remote controller includes a wireless signal transmitter I, a signal processing control module, a power supply, a panel and function buttons. On the panel of the wireless remote controller there are 6 to 18 function buttons and a control circuit connected with them, so as to control the operating state of the acousto-optic unit in any direction on the game mat. The function buttons on the panel are numbered beginning from 1 and each function button is corresponding to one acousto-optic unit on the game mat. Several colored buttons represent different colors and several sound buttons represent different kinds of sound. Without getting close to the game mat, the user just presses down these function buttons on the wireless controller and thus can control the acousto-optic unit of the game mat for switching on/off and changing the sound and light.

The wireless remote controller comes with control circuits for controlling corresponding special sounds and lights that match the selection buttons, so that the sound and light color of any acousto-optic unit can be matched in advance with the wireless remote controller. The game mat can be operated very easily and conveniently under remote control mode, even by one hand.

The game mat is provided with program control mode, remote control mode, and motion-sensing control mode which can be selected and shifted through the function buttons on the panel of the wireless remote controller.

The illuminator on the acousto-optic unit is provided with LED lamps in different colors. In order to make the infant see the light of LED lamps clearly, even at lying position, the acousto-optic unit protection cover is designed to be a circular arc several centimeters higher than the mat. This way, the light of LED lamps can be projected onto a visible surface relatively higher than the mat. The LED lamps are in red, blue and green, to match different sounds.

The illuminator of the acousto-optic unit is installed with spotlight reflectors at the bottom, which is a metal mirror in a concave funnel shape. The LED lamps are located at the concaved center of the spotlight reflector. The spotlight reflector can reflect the light from the illuminator to increase the lighting effect of the illuminator.

The acousto-optic unit protection cover is in the shape of a circular arc to prevent the infant from bumping and injuring while playing and is made of proper rigid transparent material. The material has a certain hardness to prevent the infant from damaging the acousto-optic unit by treading and squeezing the protection cover. The protection cover is made of transparent material, so that the light from the illuminator can be seen. The protection cover is provided with sound holes near the sound generator, so that the sound from the sound generator can be passed through the sound holes. A layer of soft light scattering film is sprayed on the internal surface of the protection cover, to increase the visibility of the light from the illuminator and avoid direct light to the eyes of the infant.

A perforated anti-collision cushion layer is installed outside the protection cover to protect the infant from bumping and falling down on the hard material of the protection cover. The cushion layer is made of soft material: transparent or nontransparent. If the nontransparent soft material is used, some holes are on it, so that the light of the illuminator can pass through the holes.

The sound generator includes a speaker, a digital audio file storage medium and an audio playing chip. The digital audio files stored in the storage medium are audio files of different animals' sounds or sounds of nature. There are at least three kinds of sounds to match the color of the light from the illuminator.

To realize the motion sensing control, the acousto-optic unit is provided with a vibration sensor. When the infant in the process of training and playing touches the acousto-optic unit, the vibration is converted by the vibration sensor into an electronic signal, which is transmitted through the signal transmission wires to the signal processing control chip in the acousto-optic unit. According to the control program written in advance, the acousto-optic unit at specific position can turn on and turn off the sound generator and illuminator and match or change the different sounds and colors of light, thereby realizing the control mode triggered by the user's motion and associated with user's motion, namely motion-sensing control mode.

The wireless remote controller and main controller, through the signal processing and control modules installed in the acousto-optic unit and the corresponding control programs, control the acousto-optic units at specific positions, so that specific sounds can match specific lights colors, and the sounds, colors and position can have various corresponding logical relationships for training, and strengthening the infant's logical induction and reasoning ability.

The main controller is provided with a signal reception module which can receive Bluetooth or Wi-Fi signal from common mobile phones or any other intelligent mobile terminals, decoding circuit and acousto-optic action association control module which can transmit the mobile phone signal to its rear end. The acousto-optic action association control module triggers and controls the working status, the sound generator and illuminator in each corresponding acousto-optic unit, so that the common mobile phone can change in-between the following five acousto-optic status of each acousto-optic unit on the game mat: ① Sound on or off. ② Light on or off. ③ Changing the types of sound. ④ Changing light color. ⑤ Selecting the acousto-optic unit at different directions.

The wireless remote controller is provided also with a control mode selector button, and the words of "program control", "remote control" and "motion sensing" are marked on the surface. The user can freely select program control mode, remote control mode, or motion sensing control mode on the control mode selector button.

In the program control mode, turning sound and lighting on and off, changing the types of sound, color of light, position of the acousto-optic unit are controlled according to a specific order by the prewritten program. The control programs are stored in the program control chip installed in the main controller, therefore: When the user presses down the "program control" button on the wireless remote controller, the wireless remote controller transmits the signal to trigger the program control chip. After the wireless signal receiver inside the main controller receives the signal, it transmits the signal to the program control chip. The control program starts working and controls the sound and light of each acousto-optic unit according to the prewritten program. At this point, the infant interacts and plays on the game mat according to the game set by the program.

The acousto-optic unit is also provided with sound and light delay control circuits for the following functions: The sounding time of the sound generator and the lighting time of the illuminator can be staggered at a certain time interval intentionally, so it increases the variability of the game and adjusts the difficulty degree of the training.

The acousto-optic unit is provided with a position calibration coding circuit. The position code of each acousto-optic unit is unique, so as to calibrate and distinguish acousto-optic units. When several acousto-optic units are used in a training device, the position calibration coding circuit can specify the relative position between acousto-optic units, and control the working status of the acousto-optic unit at a specified position.

The present application has following beneficial effects:

1. It is beneficial for infants, even newborn infants for sensory integration training and logical thinking training. This application is based on the Pavlovian conditioning theory and logical induction reasoning theory, combined with the mutual relationship between external sensations (seeing and hearing) and internal sensations (kinesthetic sense, equilibrium sense, organic sensation) in sports psychology. By sound and light turning on and off, connecting, combining and changing different sounds and light color and positions, the game is combined with logic training and sensory integration training. While the game gives joy to the infant, the game can also exercise and strengthen the infant's reaction speed and accuracy to the external signal stimulation, so as to increase the coordination ability between eyes, ears, hands, feet and brain in the joyful game.

2. Precise structure, scientific and reasonable design, easy to collect, carry, use and clean. The game mat is a protective cushion for the infant to play on the ground, bed or other suitable flat area. The acousto-optic unit in the game mat can also guide initiatively the infant to crawl toward different positions through light and sound for the purpose of entertainment and sports activities combined.

3. There are a variety of games, so that the infant can feel new in every play. The game mat is provided with the main controller, the wireless remote controller, and the vibration sensor, the signal processing chip and other parts in the acousto-optic unit, thereby realizing program control mode, remote control mode, and motion sensing control mode. The illuminator of the acousto-optic unit has no less than three light colors. The sound generator has also no less than three kinds of sound to match the lighting effects of the illuminator. The illuminator of the acousto-optic unit on the mat can be in different color, long light, quick flashing or slow flashing. The sound generator can be off and on. Light can be generated before sound is generated. Sound can be generated before light is generated. When the different operation modes and effects of the sound generator and illuminator are combined and staggered in settings, a variety of interesting games can be created. A variety of operating modes and the diversity of games allow people to explore new integrated modes in process of operations, so the infant can feel new in each play.

4. Multiple child safety protection designs can protect the infant from danger while playing to the greatest extent. The mat in present application is made of soft material, suitable for infant crawling and playing. The acousto-optic unit protection cover installed on the mat is in the shape of a circular arc, free of edges and corners, so as to prevent the infant from bumping and injuring while playing. The protection cover is covered externally by a perforated cushion layer, so as to protect the infant from injuries when falling down accidentally on the protection cover hard material.

A layer of soft light scattering film sprayed on the internal surface of the protection cover can reduce the intensity of the light directly into the infant's eyes and fully protect the eyesight of the infant.

5. Simple and easy disassembling process. The present application adopts a simple and easy assembling and dismantling structure, free of screws. The mat can be dismantled with hands only, without any tools. The acousto-optic units on the game mat are individual components which can be taken out from the game mat. The snap buckle is beneficial for the game mat washing. The acousto-optic unit can be taken out and reinstalled easily.

6. The wireless acousto-optic unit can be taken out from the mat so that it can be played by older children or adults. The wireless acousto-optic unit disclosed in the present application is not restricted by space and environment. It can be played at places not limited to flat ground, and not limited by the age of the player. In addition to the parts in the wireless acousto-optic unit, there are also built-in battery bin or rechargeable battery, wireless signal transmitter, wireless signal receiver, and bottom suction disc. For the user who has common infant ground mat, the wireless acousto-optic unit can be placed directly on the floor mat and fixed by the suction disc, and then the ground mat can be used for training or game. For children who can walk or run, the wireless acousto-optic unit can be fixed on a wall or other smooth vertical surface by the suction disc for training or playing on standing or walking status.

DETAILED DESCRIPTION

This application is explained further together with the embodiments and figures, but the protection scope of the present application is not limited to the following specific embodiments.

Embodiment 1

Figure 1:
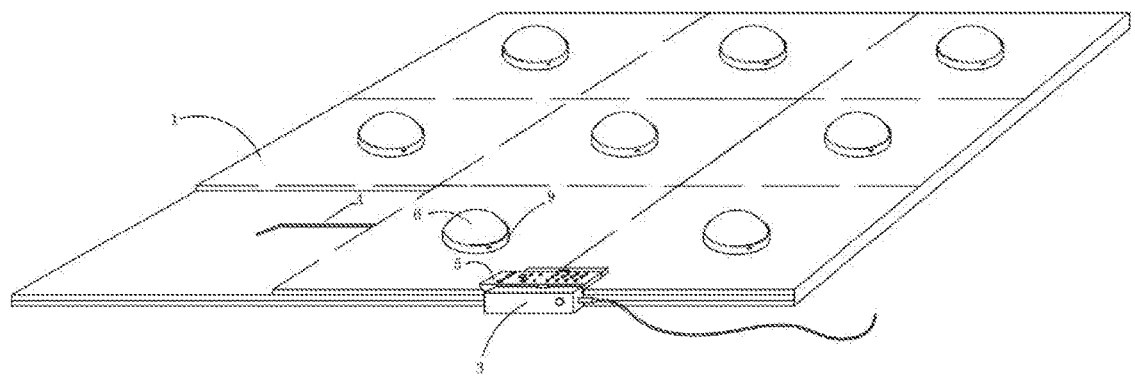
FIG. 1 is the structure view of one embodiment disclosed in the present application.
Figure 2:
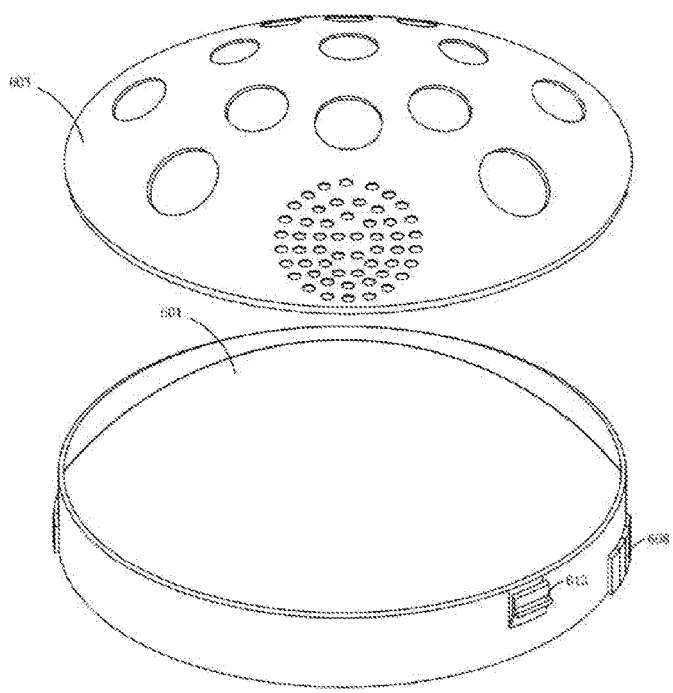
FIG. 2 is the profile structure view of acousto-optic unit in one embodiment disclosed in the present application.
Figure 3:
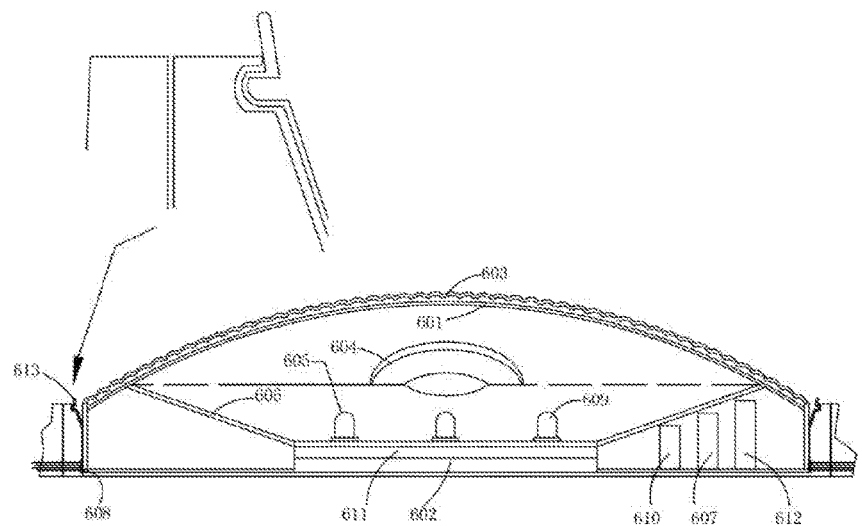
FIG. 3 is the partial structure cross-sectional view of acousto-optic unit (wired connection) in one embodiment disclosed in the present application.
Figure 4:
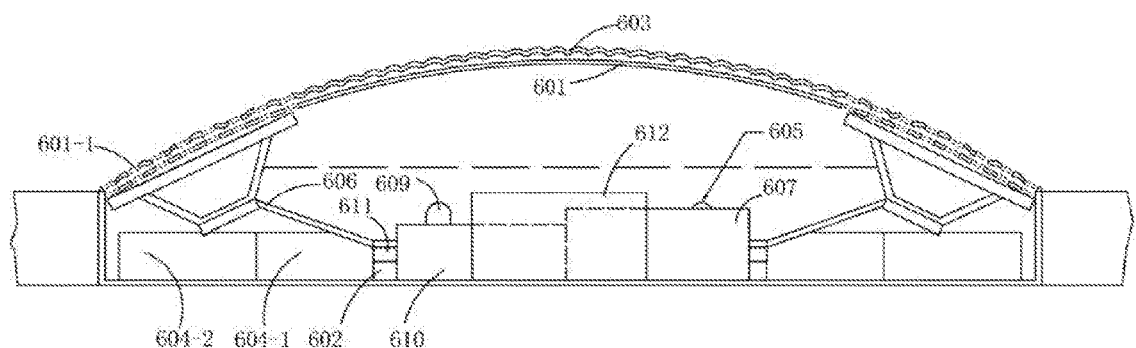
FIG. 4 is the partial structure cross-sectional view of acousto-optic unit (wired connection) at another view angle in one embodiment disclosed in the present application.
Figure 5:
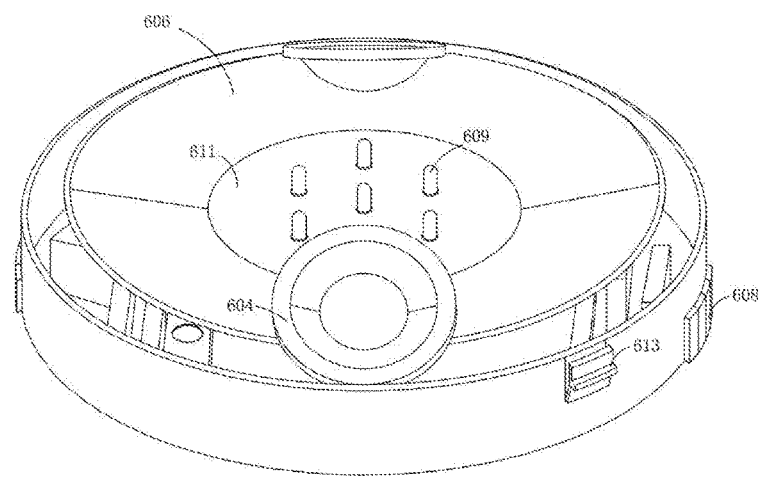
FIG. 5 is the internal structure view of acousto-optic unit (wired connection) in one embodiment disclosed in the present application.
Figure 6:
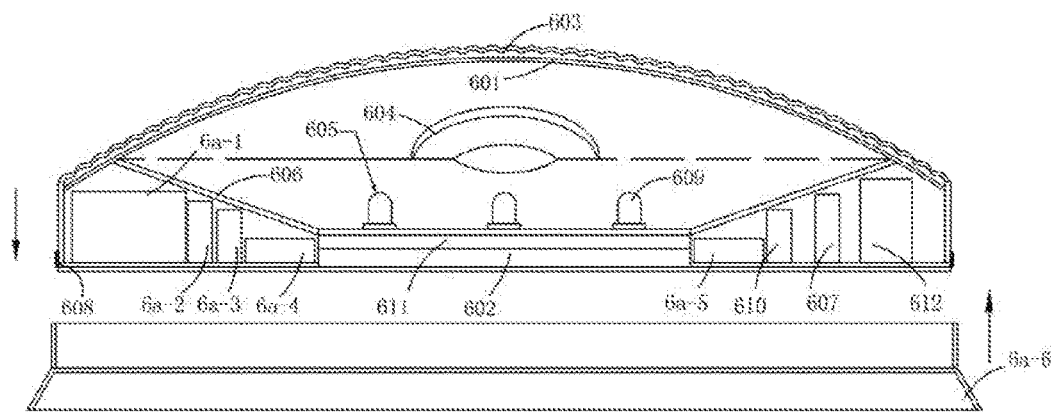
FIG. 6 is the partial structure cross-sectional view of wireless acousto-optic unit (wireless connection) in one embodiment disclosed in the present application.
Figure 7:
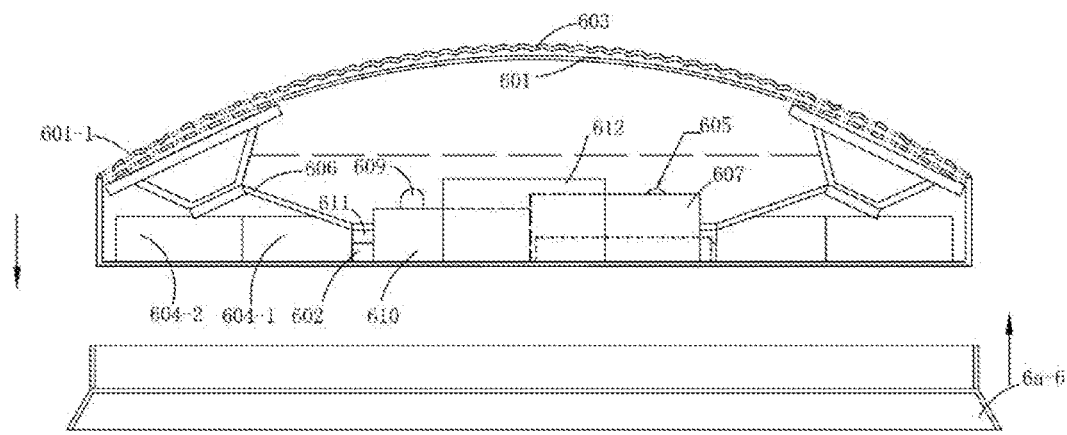
FIG. 7 is the partial structure cross-sectional view of wireless acousto-optic unit (wireless connection) in another view angle in one embodiment disclosed in the present application.
Figure 8:
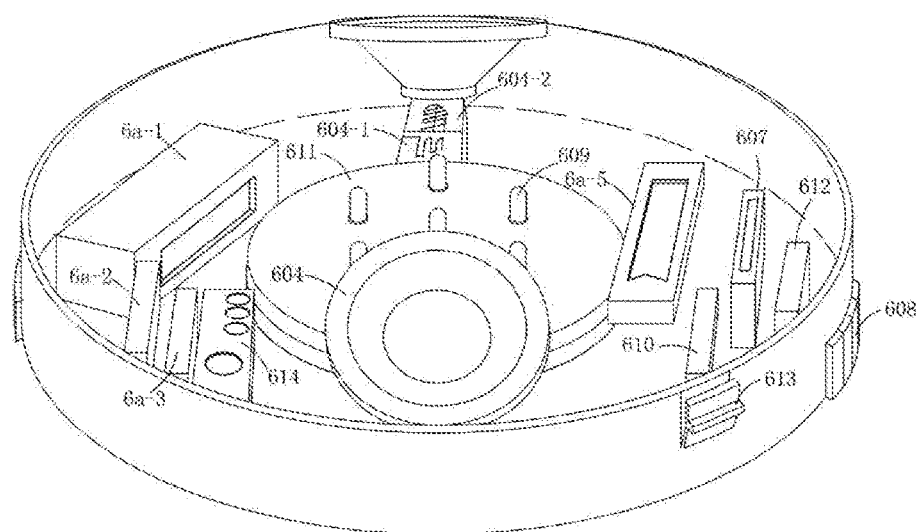
FIG. 8 is the internal structure view of wireless acousto-optic unit (wireless connection) in one embodiment disclosed in the present application.
Figure 9:
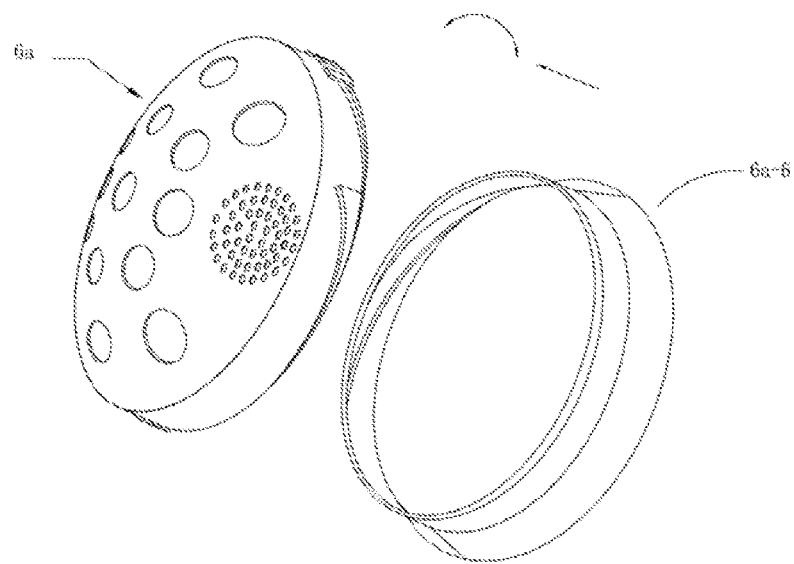
FIG. 9 is the disassembling and assembling structure view of wireless acousto-optic unit and suction disc in one embodiment disclosed in the present application.

As shown in FIG. 1, a multi-mode controlled acousto-optic interaction infant game mat with logic and sensory integration training function includes mat body (1), a main controller (3) placed at one side of the mat (1), transmission wires (4) embedded in the mat, a wireless remote controller (5) and acousto-optic units (6). There are several round holes on the mat (1). The snap rings (9) are installed around the internal edge of the round holes for installing and fixing the acousto-optic units (6). The acousto-optic units (6) are connected and the acousto-optic units (6) and main controller (3) are connected by the transmission wires (4) embedded inside the mat (1).

It is described further in FIG. 2-5 that the acousto-optic unit (6) includes mainly a protection cover (601), a vibration sensor (602), a perforated anti-collision mat layer (603), sound generators (604), illuminators (605), a spotlight reflector (606), a signal processing control chip II (607), a digital audio file storage medium (604-2), an audio playing chip (604-1), a power amplifying circuit (611), a LED drive chip (612) and a branch electric contact III (608).

A branch electric contact III (608) is installed at the bottom of the housing of the acousto-optic unit (6). One surface of the contact is faced outward and another side is faced towards the acousto-optic unit (6) to connect with wire pins from the devices on the electric circuit board inside the acousto-optic unit (6). When the acousto-optic unit is installed and fixed on the snap ring (9), the branch electric contact III (608) on the acousto-optic unit (6) is connected with the branch electric contact IV (9-2) on the snap ring (9), so that the control signal, audio signal and electric current from the controller can be transmitted to the signal processing control chip II (607) in the acousto-optic unit (6) for controlling the acousto-optic unit (6) and changing working status.

The illuminator (605) on the acousto-optic unit (6) is provided with LED lamps (609) in different colors. In order to make the infant see the light of LED lamps (609) clearly even in lying position, the protection cover (601) of the acousto-optic unit (6) is designed to be a circular arc several centimeters higher than the mat. In this way, the light of LED lamp (609) can be projected onto a visible surface relatively higher than the mat. LED lamps (609) are in red, blue and green at least to match different sounds.

The illuminator (605) of the acousto-optic unit (6) is installed with a spotlight reflector (606) at the bottom, which is a metal mirror in a concave funnel shape. The LED lamps (609) are located at the concaved center of the spotlight reflector (606). The spotlight reflector (606) can reflect the light from the illuminator (605) to increase the lighting effect of the illuminator (605).

The acousto-optic unit (6) protection cover (601) is in the shape of a circular arc and is made of proper rigid transparent material to prevent the infants from bumping and injuring while playing. The material has a certain hardness to prevent infants from damaging the acousto-optic unit (6) by treading and squeezing the protection cover (601). The protection cover (601) is made of transparent material, so that the light from the illuminator (605) can be seen. The protection cover (601) is provided with sound holes (601-1) near the sound generator (604), so that the sound from the sound generator (604) can be transmitted through the sound holes (601-1). A layer of soft light scattering film is sprayed on the internal surface of the protection cover (601) to increase the visibility of the light from the illuminator (605), and avoid direct light to the eyes of the infant.

A perforated collision defend cushion layer (603) is installed outside the protection cover (601). In order to protect the infant from bumping and falling down on the hard material of the protection cover (601), the cushion layer is made of soft material, transparent or nontransparent. If the nontransparent soft material is used, some holes are on it, so that the light of the illuminator (605) can be passed through the holes.

The sound generator (604) includes a speaker, a digital audio file storage medium (604-2) and an audio playing chip (604-1). The digital audio files stored in the storage medium (604-2) are audio files of different animals' sounds or the sounds of nature. There are at least three kinds of sound to match the colors of the light from the illuminator (605).

To realize the motion sensing control, the acousto-optic unit (6) is provided with a vibration sensor (602). When the infant in the process of training and playing touches one acousto-optic unit (6), the vibration generated is converted by the vibration sensor (602) into an electronic signal, which is transmitted through the signal transmission wires to the signal processing control chip (607) in the acousto-optic unit (6). According to the prewritten control program, the acousto-optic unit (6) at specific positions can turn on and turn off the sound generator and illuminator according to the program and match or change the different sounds and colors of light, thereby realizing the control mode triggered by the user's motion and associated with user's motion, namely motion-sensing control mode.

The wireless remote controller (5) and main controller (3), through the signal processing and control modules installed in the acousto-optic unit (6) and the corresponding control programs, control the acousto-optic units (6) at specific positions, so that specific sounds can match specific lights colors, and the sounds, colors and position can have various corresponding logical relationships for training, and strengthening the infant's logical induction and reasoning ability.

The acousto-optic unit (6) is equipped also with sound and light delay control circuit (614) for the following functions: The sounding time of the sound generator (604) and the lighting time of the illuminator (605) can be staggered intentionally at a certain time interval, so it increases the variability of the game and adjusts the difficulty degree of the training.

The acousto-optic unit (6) is provided with a position calibration coding circuit (610). The position code of each acousto-optic unit (6) is unique, so as to calibrate and distinguish acousto-optic units (6). When several acousto-optic units (6) are used in a training device, the position calibration coding circuit can specify the relative position between acousto-optic units, and control the working status of the acousto-optic unit (6) at a specified position.

Figure 14:
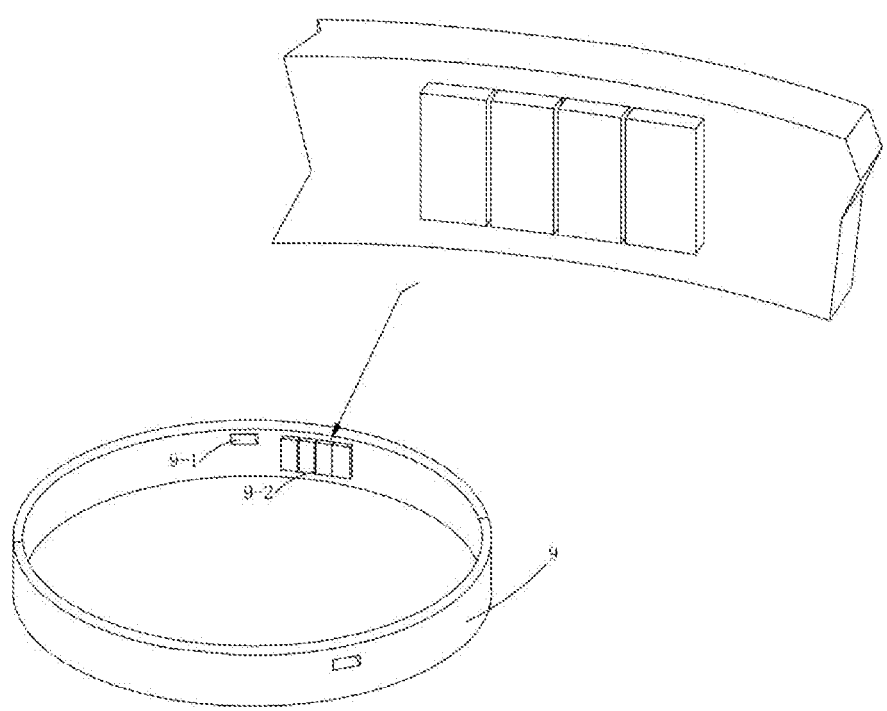
FIG. 14 is the structure view of the snap ring in one embodiment disclosed in the present application.

It is described further, as shown in FIG. 14, that the snap ring (9) is provided with two snap ports (9-1) at opposite positions for fixing the acousto-optic unit (6) and the branch electric contact IV (9-2). When the acousto-optic unit (6) is placed into the snap ring (9), the snap ports (9-1) are aligned with two snap buckles (613) on the acousto-optic unit (6) to fix the acousto-optic unit (6). If the acousto-optic unit needs to be taken out, just press down the snap buckles (613). This structure is beneficial to cleaning the game mat as the acousto-optic unit can be removed and reinstalled easily, and can also prevent the infant from moving or taking away the acousto-optic unit.

All transmission wires of each acousto-optic unit (6) and the main controller (3) are embedded in the mat body. Only one end is connected with the branch electric contact IV (9-2) on the corresponding snap ring (9).

Figure 10:
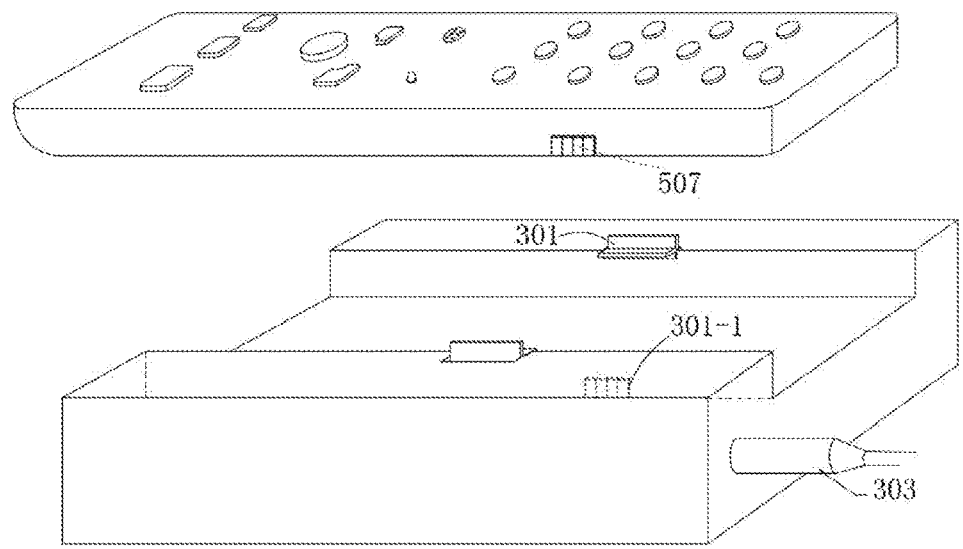
FIG. 10 is the disassembling and assembling structure view of main controller and wireless remote controller in one embodiment disclosed in the present application.
Figure 11:
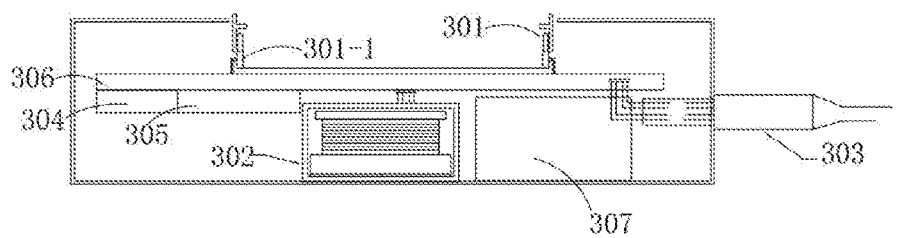
FIG. 11 is the internal structure view of main controller in one embodiment disclosed in the present application.

It is further described, as shown in FIGS. 10-11, that a main controller (3) is installed at an appropriate position of the mat (1). The main controller (3) is mainly composed of a wireless remote controller rack (301), a transformer (302), external power supply wires (303), a centralized signal processing control module (304), a wireless signal receiving module (305), a program control chip (306), and a working power supply (307).

The rack (301) is installed on the upper surface of the main controller (3) and is in a recessed downward shape. The width and size of the recessed area is fitted for the wireless remote controller (5). Lugs symmetrically disposed on both sides of the rack (301) are used for clamping and fixing the controller. When the wireless remote controller (5) is placed in the rack (301), there are no panels or buttons on the main controller, but only the panel (504) and function buttons (505) of the remote wireless control (5) are used. This is realized by the branch electric contact II (507) at the corresponding position of the rack (301) lug and the wireless remote controller (5). When the wireless remote controller (5) is placed into the rack (301), the branch electric contact II (507) on the wireless remote controller (5) is connected with the branch electric contact I (301-1) on the rack (301) lug. The control signal can then be transmitted, so panel (504) and the function buttons (505) of the wireless remote controller (5) can be operated to control the main controller.

The main controller (3) is provided with a signal reception module which can receive Bluetooth or Wi-Fi signal from common mobile phones or any other intelligent mobile terminals, a decoding circuit and an acousto-optic action association control module which can transmit the mobile phone signal to its back end. The acousto-optic action association control module triggers and controls the working status of the sound generator (604) and the illuminator (605) in each corresponding acousto-optic unit, so that the common mobile phone can change in-between the following five acousto-optic actions of each acousto-optic unit on the game mat:

① Sound on or off. ② Light on or off. ③ Changing the types of sound. ④ Changing light color. ⑤ Selecting the acousto-optic unit at different directions.

Figure 12:
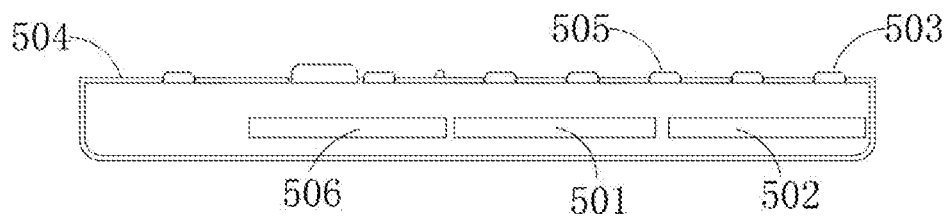
FIG. 12 is the structure view of the wireless remote controller in one embodiment disclosed in the present application.
Figure 13:
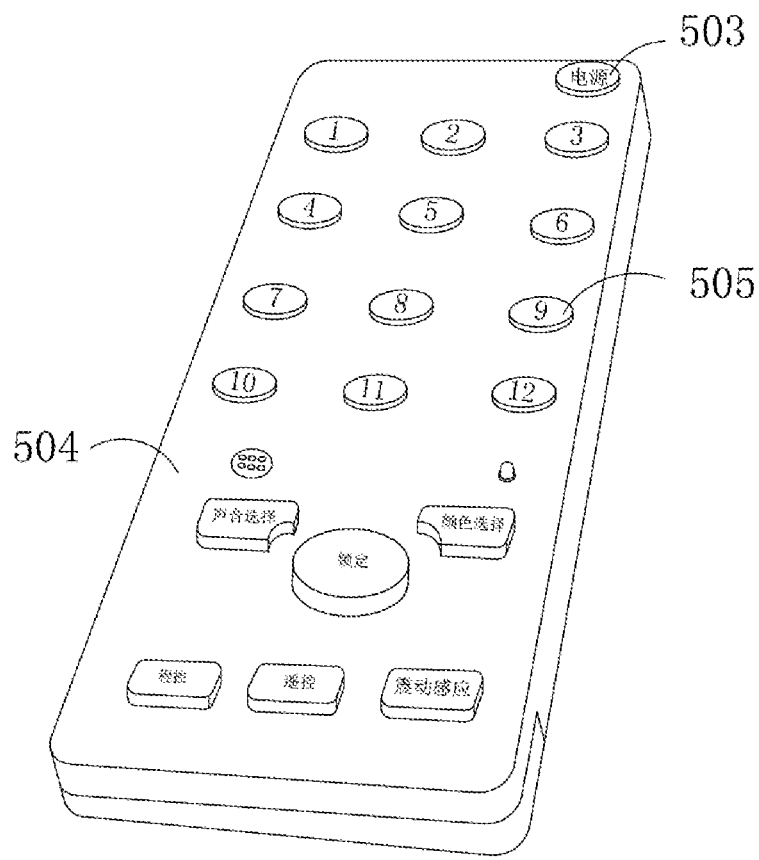
FIG. 13 is the partial structure cross-sectional view of the wireless remote controller in another view angle in one embodiment disclosed in the present application.

It is described further, as shown in FIGS. 12-13, that a wireless remote controller (5) can control the game mat for all functions in a long distance away. The functions include changing sound and light on and off, changing direction, changing the types of sounds and light colors and selecting control mode. The wireless remote controller (5) includes a wireless signal transmitter I (501), a signal processing control module (502), a power supply (503), and panel (504) and function buttons (505). The panel (504) of the wireless remote controller (5) is provided with 6 to 18 function buttons (505) and a control circuit connected with them, so as to control the operating status of the acousto-optic unit (6) in any direction on the game mat. The digital function buttons (505) on the panel (504) are numbered from 1 and each function button (505) is corresponding to one acousto-optic unit (6) on the game mat. Several colored buttons represent different color and several sound buttons represent different kinds of sound. Without being near the game mat, the user just presses down these function buttons (505) on the wireless controller and thus can control remotely the acousto-optic unit (5) of the game mat for switching on/off and changing the sound and light.

The wireless remote controller (5) is provided with sound and light matching selection buttons and corresponding control circuits, to match in advance the sound and light color of any acousto-optic unit (6) with the wireless remote controller (5). The game mat can be operated very easily and conveniently under remote control mode, even by one hand.

The game mat is provided with program control mode, remote control mode, and motion-sensing control mode which can be selected and shifted through the function buttons (505) on the panel (504) of the wireless remote controller (5).

The wireless remote controller (5) is provided also with control mode selector button, and the words of "program control", "remote control" and "motion sensing" are marked on the surface. The user can freely select program control mode, remote control mode, or motion sensing control mode on the control mode selector button.

In the program control mode, turning sound and light on and off, changing the types of sound, color of light, position of the acousto-optic unit are controlled by prewritten programs according to a specific order. The control programs are stored in the program control chip (306) installed in the main controller, therefore: When the user presses down "program control" button on the wireless remote controller (5), the wireless remote controller (5) transmits the signal to trigger the program control chip (306). After the wireless signal receiver inside the main controller receives the signal, it transmits the signal to the program control chip (306). The control program starts working and controls the sound and light of each acousto-optic unit (5). At this point, the infant interacts and plays on the game mat according to the game set by the program.

Embodiment 2

The difference between this embodiment and embodiment 1 is that: As shown in FIGS. 6-9, when the acousto-optic units (6) are connected in wireless connection mode, the acousto-optic unit is a wireless acousto-optic unit (6a). Compared with the wired acousto-optic unit (6), the wireless acousto-optic unit (6a) is provided with a built-in battery bin or a rechargeable battery (6a-1), a wireless signal emitter II (6a-2), a wireless signal receiver II (6a-3), a signal processing control chip I (6a-5) and a suction disc (6a-6).

The wireless acousto-optic unit (6a) in wireless connection mode is provided with wireless signal transmission module inside. The module is composed of the wireless signal transmitter II (6a-2) and the wireless signal receiver II (6a-3). When the wireless receiver II (6a-3) inside the acousto-optic unit (6a) receives the control signal, the signal is transmitted to the signal processing control chip I (6a-5) at the back end. The control chip converts any signal into multiple action commands, and transmits the commands respectively to the audio playing chip (604-1), the power amplifying circuit (619), till to sound generator (604), or to LED drive chip (612), till to LED lamp (609), to start and change the sound and light of the wireless acousto-optic unit (6a). In motion sensing control mode, the signal processing control chip I (6a-5) can also emit sound and light control signals for turning on and off the sound generator (604) and the illuminator (605) of other wireless acousto-optic units, changing sound and lamp color. The sound and light control signals are transmitted by the wireless signal transmitter II (6a-2) of the present acousto-optic unit to the wireless signal receiver II (6a-3) of other wireless acousto-optic units. After the wireless signal receiver II (6a-3) receives the sound and light control signals, it transmits the signals to the signal processing control chip I (6a-5) of the acousto-optic unit. The signal processing control chip II (607), through the audio playing chip (604-1), the power amplifying circuit (611), the LED drive chip (612), the sound generator (604) and the LED lamps (609), finally realizes turning on and off the sound generator (604) and the illuminator (605) of the wireless acousto-optic unit, and change the sound and the lamp color.

The wireless acousto-optic unit (6a) at the bottom is provided with a suction disc (6a-6), which is in screw snap structure, and can be separated independently from the wireless acousto-optic unit (6a). When the suction disc (6a-6) is used, press and rotate the suction disc (6a-6) at the bottom, and the suction disc (6a-6) can be fixed on the wireless acousto-optic unit (6a), so as to realize the following functions: ① For a user who has a common infant ground mat, the wireless acousto-optic unit (6a) can be placed directly on the floor mat and fixed by the suction disc (6a-6), and then the ground mat can be used for training or game. ② For infants who can walk or run, the wireless acousto-optic unit (6a) can be fixed on a wall or other smooth vertical surfaces with the suction disc (6a-6) for training or playing games on standing or walking status.

What is claimed is:

1. A multi-mode controlled acousto-optic interaction infant game mat with logic and sensory integration training function, wherein it includes a mat body, a main controller at one side of the mat, transmission wires embedded in the mat, a wireless remote controller and a plurality of acousto-optic units, wherein there are several round holes on the mat, and snap rings are installed around the internal edge of the round holes for installing and fixing acousto-optic units; wherein the acousto-optic units are connected to each other and each of the acousto-optic units are connected to the main controller by the transmission wires embedded inside the mat, wherein each of the acousto-optic units comprises a protection cover, a vibration sensor, a perforated anti-collision mat layer, a sound generator, an illuminator, a spotlight reflector, a signal processing control chip II, a digital audio file storage medium, an audio playing chip, a power amplifying circuits, a LED drive chip and a branch contact III.

2. The multi-mode controlled acousto-optic interaction infant game mat with logic and sensory integration training function according to claim 1, wherein the acousto-optic units are connected with each other in wired mode or wireless connection mode; when using wired connection mode, the transmission wires are electric wires, wherein the acousto-optic units are connected with each other, and the acousto-optic unit and the main controller are connected by the electric wires which are used for transmitting current sound and light control signals; when using wireless connection mode, the acousto-optic unit is a wireless acousto-optic unit; compared with the wired acousto-optic unit, the wireless acousto-optic unit is further provided with a built-in battery bin or a rechargeable battery, a wireless signal transmitter II, a wireless signal receiver II, a signal processing control chip I and a suction disc.

3. The multi-mode controlled acousto-optic interaction infant game mat with logic and sensory integration training function according to claim 2, wherein the wireless acousto-optic unit in wireless connection mode is provided with wireless signal transmission module, wherein the module is composed of a wireless signal transmitter II and a wireless signal receiver II; when the wireless receiver II inside the acousto-optic unit receives the control signal, the control signal is transmitted to the signal processing control chip I at a back end, and the control chip converts any signal into multiple action commands, and transmits the commands respectively to the audio playing chip, the power amplifying circuit, till to the sound generator, or to the LED drive chip, till to the LED lamp, so as to start and change the sound and light of the wireless acousto-optic unit; wherein in motion sensing control mode, the signal processing control chip I can also emit sound and light control signal for turning on and off the sound generator and the illuminator of other wireless acousto-optic units, changing sound and lamp color; wherein the sound and light control signals are transmitted by the wireless signal transmitter II of the acousto-optic unit to the wireless signal receiver II of other wireless acousto-optic units; after the wireless signal receiver II receives the sound and light control signals, it transmits the signals to the signal processing control chip I of the acousto-optic unit; wherein the signal processing control chip II, through the audio playing chip, the power amplifying circuit, the LED drive chip, the sound generator and the LED lamp, finally realizes to turn on and off the sound generator and the illuminator of the wireless acousto-optic unit, and change the sound and lamp color.

4. The multi-mode controlled acousto-optic interaction infant game mat with logic and sensory integration training function according to claim 3, wherein the wireless acousto-optic unit at the bottom is provided with a suction disc, which is in a screw snap structure, and can be separated independently from the wireless acousto-optic unit, when the suction disc is used, press and rotate the suction disc at the bottom, and then the suction disc can be fixed on the wireless acousto-optic unit, so as to realize the following functions: ① for a user who has a common infant ground mat, the wireless acousto-optic unit can be placed directly on the floor mat, and be fixed by the suction disc, and then it can be used for training or game; and ② for infants who can walk or run, the wireless acousto-optic unit can be fixed on a wall or other smooth vertical surfaces with the suction disc for training or playing games on standing or walking status.

5. The multi-mode controlled acousto-optic interaction infant game mat with logic and sensory integration training function according to claim 1, wherein all transmission wires of each acousto-optic unit and the main controller are embedded in the mat body, with only one end being connected with a branch electric contact IV on the corresponding snap ring.

6. The multi-mode controlled acousto-optic interaction infant game mat with logic and sensory integration training function according to claim 1, wherein the main controller is installed at the mat, wherein the main controller comprises a wireless remote controller rack, a transformer, external power supply wire, a centralized signal processing control module, a wireless signal receiving module, a program control chip and a working power supply.

7. The multi-mode controlled acousto-optic interaction infant game mat with logic and sensory integration training function according to claim 6, wherein the rack is installed on the upper surface of the main controller and is in recessing downward shape, wherein the width and size of the recessed area is fitted for the wireless remote controller, wherein lugs symmetrically disposed on both sides of the rack are used for clamping and fixing the controller; when the wireless remote controller is placed in the rack, when the wireless remote controller is placed into the rack, a branch electric contact II on the wireless remote controller is connected with a branch electric contact I on the lugs of the rack, and the control signal can then be transmitted, so a panel and function buttons of the wireless remote controller can be operated to control the main controller.

8. The multi-mode controlled acousto-optic interaction infant game mat with logic and sensory integration training function according to claim 1, wherein the snap ring is provided with two snap ports at opposite positions for fixing the acousto-optic unit and the branch electric contact IV; when the acousto-optic unit is placed into the snap ring, the snap ports are aligned with two snap buckles on the acousto-optic unit to fix the acousto-optic unit.

9. The multi-mode controlled acousto-optic interaction infant game mat with logic and sensory integration training function according to claim 8, wherein the wireless remote controller is provided with sound and light matching selection buttons and corresponding control circuits, so that the sound and light color of any acousto-optic units on the game mat can be matched in advance with the wireless remote controller, and thus the game mat can be operated very easily and conveniently under remote control mode, even by one hand.

10. The multi-mode controlled acousto-optic interaction infant game mat with logic and sensory integration training function according to claim 8, wherein the game mat is provided with a program control mode, a remote control mode, and a motion-sensing control mode, which can be selected and shifted through the function buttons on the panel of the wireless remote controller.

11. The multi-mode controlled acousto-optic interaction infant game mat with logic and sensory integration training function according to claim 1, wherein a branch electric contact III is installed at the bottom of a housing of the acousto-optic unit, wherein one surface of the contact is faced outward and another surface is faced towards the acousto-optic unit to connect with wire pins from the devices on the electric circuit board inside the acousto-optic unit; when the acousto-optic unit is installed and fixed on the snap ring, the branch electric contact III on the acousto-optic unit is connected with the branch electric contact IV on the snap ring, so that control signal, audio signal and electric current from the controller can be transmitted to the signal processing control chip II in the acousto-optic unit for controlling the acousto-optic unit and changing working status.

12. The multi-mode controlled acousto-optic interaction infant game mat with logic and sensory integration training function according to claim 1, wherein a wireless remote controller is configured to control the game mat for all functions, wherein the functions include sound and light switching on and off, changing direction, changing the types of sound and light color, selecting control mode.

13. The multi-mode controlled acousto-optic interaction infant game mat with logic and sensory integration training function according to claim 12, wherein the wireless remote controller includes a wireless signal transmitter I, a signal processing control module, a power supply, a panel and function buttons, wherein the panel of the wireless remote controller is provided with 6 to 18 function buttons and a control circuit connected with them, so as to control the operating status of the acousto-optic unit in any direction on the game mat, wherein the function buttons on the panel are numbered from 1 and each function button is corresponding to one acousto-optic unit on the game mat, wherein several colored buttons represent different color and several sound buttons represent different kinds of sound.

14. The multi-mode controlled acousto-optic interaction infant game mat with logic and sensory integration training function according to claim 13, wherein the wireless remote controller is provided also with control mode selector buttons, and the words of "program control", "remote control" and "motion sensing" are marked on the surface; wherein a user can select freely program control mode, remote control mode, and motion sensing control mode on the control mode selector button.

15. The multi-mode controlled acousto-optic interaction infant game mat with logic and sensory integration training function according to claim 14, wherein: in the program control mode, sounding and lighting on and off, changing the types of sound, color of light, position of the acousto-optic units are controlled by a prewritten program according to a specific order; wherein the programs is stored in a program control chip installed in the main controller, thereby realizing: When an user presses down "program control" button on the wireless remote controller, the wireless remote controller transmits the signal to trigger the program control chip; after the wireless signal receiver inside the main controller receives the signal, it transmits the signal to the program control chip; wherein the program starts working and controls the sound and light of each acousto-optic unit, and thus an infant interacts and plays on the game mat according to the game set by the program.

16. The multi-mode controlled acousto-optic interaction infant game mat with logic and sensory integration training function according to claim 12, wherein the illuminator of the acousto-optic unit is installed with a spotlight reflector at the bottom, which is a metal mirror in a concave funnel shape, and the LED lamp are located at the concaved center of the spotlight reflector; wherein the spotlight reflector can reflect the light from the illuminator to increase the lighting effect of the illuminator.

17. The multi-mode controlled acousto-optic interaction infant game mat with logic and sensory integration training function according to claim 1, wherein the illuminator on the acousto-optic unit is provided with LED lamps in different color; wherein in order to make the infant see the light of LED lamps clearly even at lying position, the protection cover of the acousto-optic unit is designed to be a circular arc several centimeters higher than the mat, whereby, the light of LED lamp can be projected onto a visible surface relatively higher than the mat; wherein the LED lamps are in red, blue and green at least, so as to match different sounds.

18. The multi-mode controlled acousto-optic interaction infant game mat with logic and sensory integration training function according to claim 1, wherein the protection cover of the acousto-optic unit is in the shape of a circular arc to prevent the infant from bumping and injuring while playing, and it is made of proper rigid transparent material so as to prevent the infant from damaging the acousto-optic unit by treading and squeezing the protection cover; wherein the protection cover is made of transparent material, so that the light from the illuminator can be seen; wherein the protection cover is provided with sound holes near the sound generator, so that the sound from the sound generator can be transmitted through the sound holes; wherein a layer of soft light scattering film is sprayed on the internal surface of the protection cover so as to increase the visibility of the light from the illuminator, and avoid direct light into the eyes of the infant.

19. The multi-mode controlled acousto-optic interaction infant game mat with logic and sensory integration training function according to claim 18, wherein a perforated anti-collision cushion layer is installed outside the protection cover so as to protect the infant from bumping and falling down on the hard material of the protection cover; wherein the cushion layer is made of transparent or nontransparent soft material; wherein If the nontransparent soft material is used, some holes are on it, so that the light of the illuminator can be passed through the holes.

20. The multi-mode controlled acousto-optic interaction infant game mat with logic and sensory integration training function according to claim 1, wherein the sound generator includes a speaker, a digital audio file storage medium and an audio playing chip; wherein the digital audio files stored in the storage medium are audio files of different animals' sound or the sound of nature; wherein there are at least three kinds of sound to match the color of light from the illuminator.

21. The multi-mode controlled acousto-optic interaction infant game mat with logic and sensory integration training function according to claim 1, wherein the acousto-optic unit is provided with a vibration sensor to realize the motion sensing control mode; when an infant in the process of training and playing touches one acousto-optic unit, the vibration generated is converted by the vibration sensor into an electronic signal, which is transmitted through the signal transmission wires to the signal processing control chip in the acousto-optic unit; wherein according to prewritten control program, the acousto-optic unit at specific position can turn on and turn off the sound generator and the illuminator, and match and change different sounds and colors of light, thereby realizing the control mode triggered by the user's motion and associated with user's motion, namely motion-sensing control mode.

22. The multi-mode controlled acousto-optic interaction infant game mat with logic and sensory integration training function according to claim 1, wherein the wireless remote controller and the main controller, through signal processing and control modules installed in the acousto-optic unit and corresponding control programs, control the acousto-optic units at specific positions, so that specific sounds can match specific lights colors; wherein the sound, color and position can have various corresponding logical relationship for training, and strengthening an infant's logical induction and reasoning ability.

23. The multi-mode controlled acousto-optic interaction infant game mat with logic and sensory integration training function according to claim 1, wherein the main controller is provided with a signal reception module which is able to receive Bluetooth or Wi-Fi signal from a mobile phone or any other intelligent mobile terminal, decoding circuit and acousto-optic action connection control module which can transmit the mobile phone signal to the back end; wherein the acousto-optic action association control module triggers and controls the working status of the sound generator and the illuminator in each corresponding acousto-optic unit, so that the mobile phone can change the following five acousto-optic actions of each acousto-optic unit on the game mat: ① Sound on or off; ② Light on or off; ③ Changing of types of sound; ④ Changing light color; ⑤ Selecting the acousto-optic unit at different directions.

24. The multi-mode controlled acousto-optic interaction infant game mat with logic and sensory integration training function according to claim 1, wherein the acousto-optic unit is provided also with sound and light delay control circuits for the following functions: the sounding time of the sound generator and the lighting time of the illuminator can be staggered at a certain time interval intentionally, so as to increase the variability of the game and adjust the difficulty degree of the training.

25. The multi-mode controlled acousto-optic interaction infant game mat with logic and sensory integration training function according to claim 1, wherein the acousto-optic unit is provided with a position calibration coding circuit; wherein a position code of each acousto-optic unit is unique, for marking and distinguishing acousto-optic units; when several acousto-optic units are used in a training device, the position calibration coding circuit can specify the relative position between acousto-optic units, and control the working status of the acousto-optic unit at a specified position.

* * * * *